July 19, 1938.  C. W. SHERMAN  2,124,170

DOOR STRUCTURE

Filed Nov. 21, 1936  9 Sheets-Sheet 1

Inventor:
Charles W. Sherman,
By Emery, Booth, Townsend, Miller & Weidner
Attys.

July 19, 1938.  C. W. SHERMAN  2,124,170
DOOR STRUCTURE
Filed Nov. 21, 1936   9 Sheets-Sheet 2

Inventor:
Charles W. Sherman
by Emery, Booth, Townsend, Miller & Weidner
Attys.

July 19, 1938.  C. W. SHERMAN  2,124,170
DOOR STRUCTURE
Filed Nov. 21, 1936   9 Sheets—Sheet 3
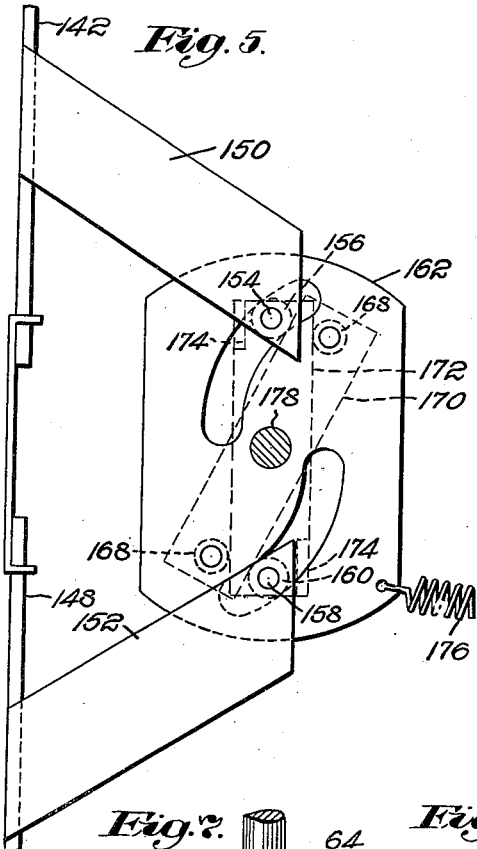
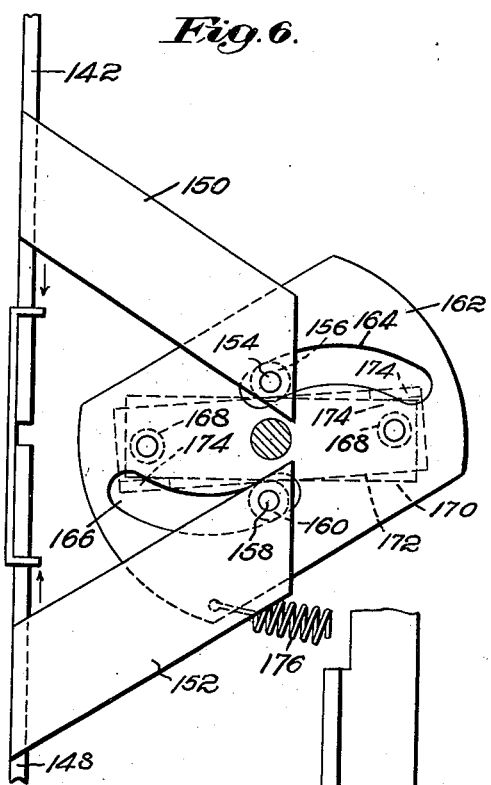
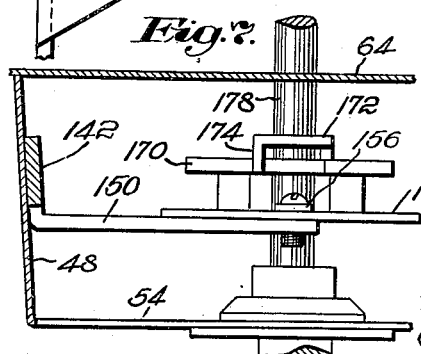
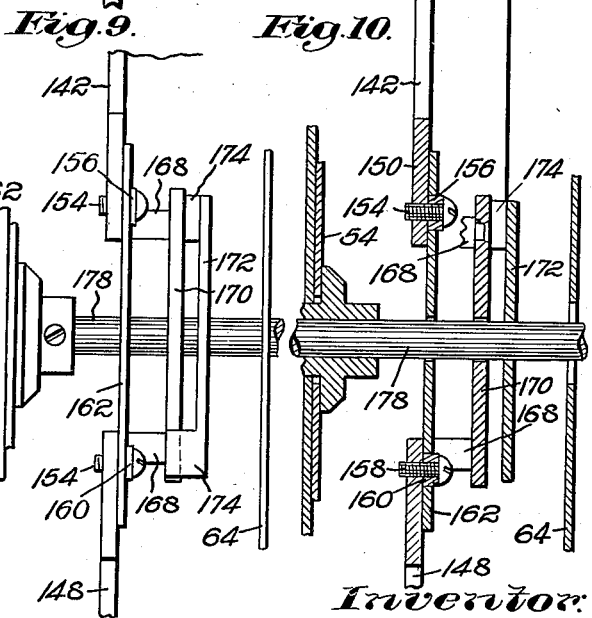
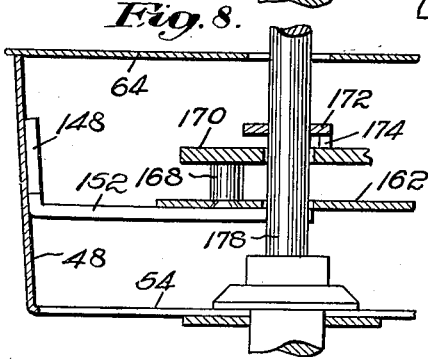
Inventor:
Charles W. Sherman
by Emery, Booth, Townsend, Miller & Neisner
Attys.

July 19, 1938.   C. W. SHERMAN   2,124,170
DOOR STRUCTURE
Filed Nov. 21, 1936   9 Sheets-Sheet 4
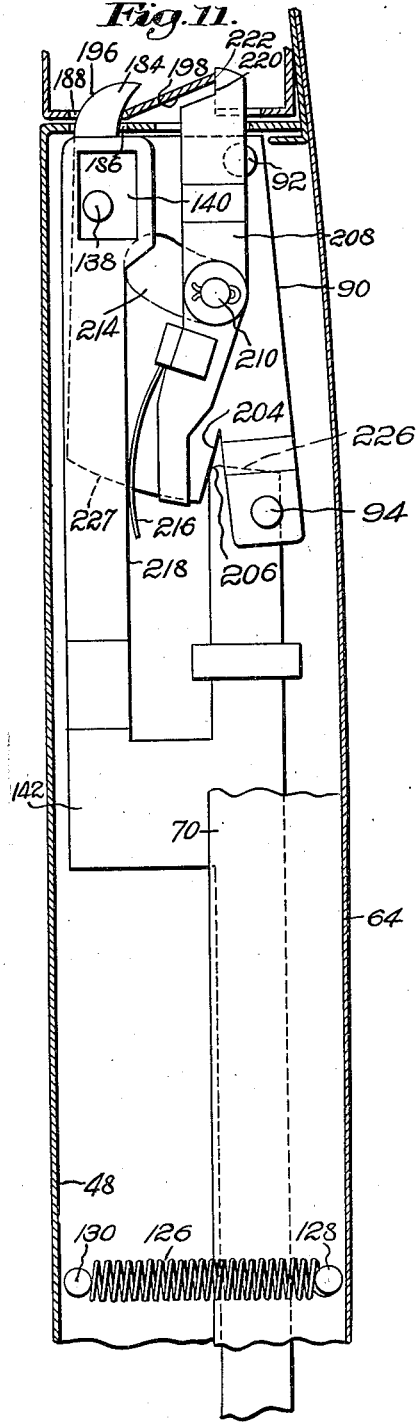
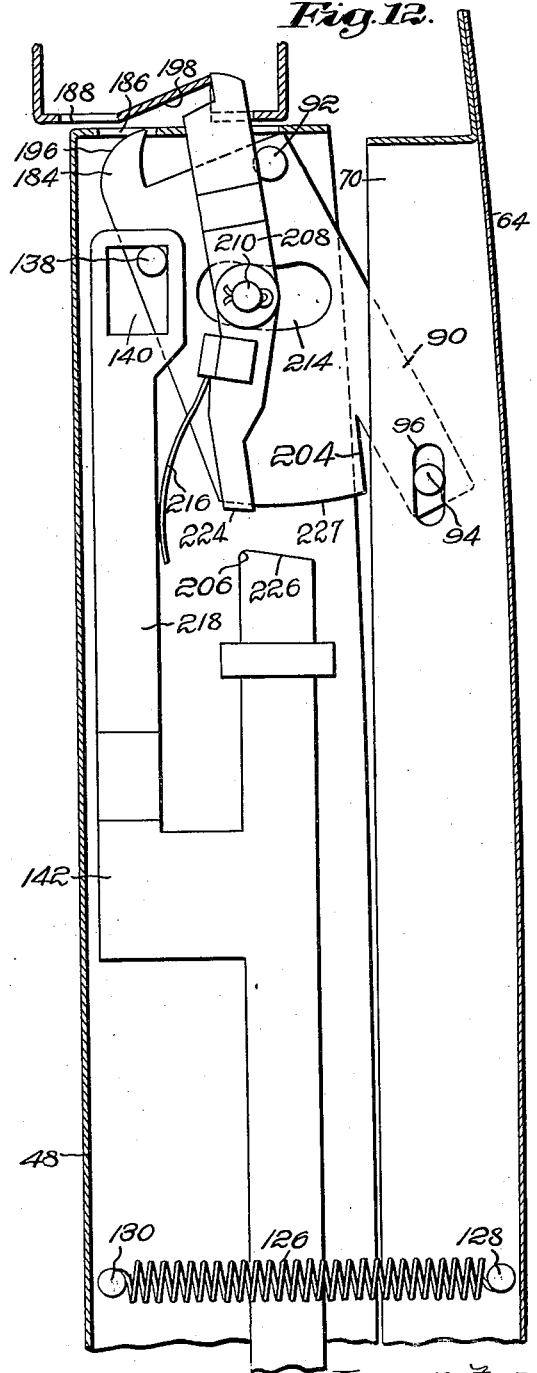
Inventor
Charles W. Sherman
Attys

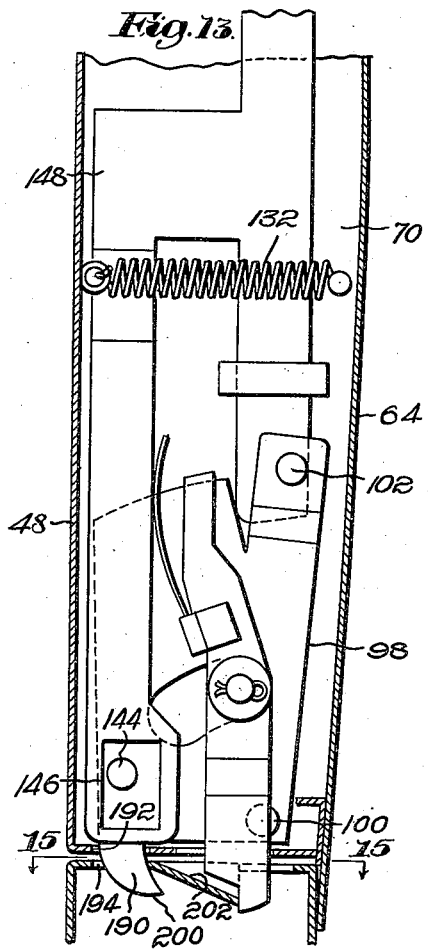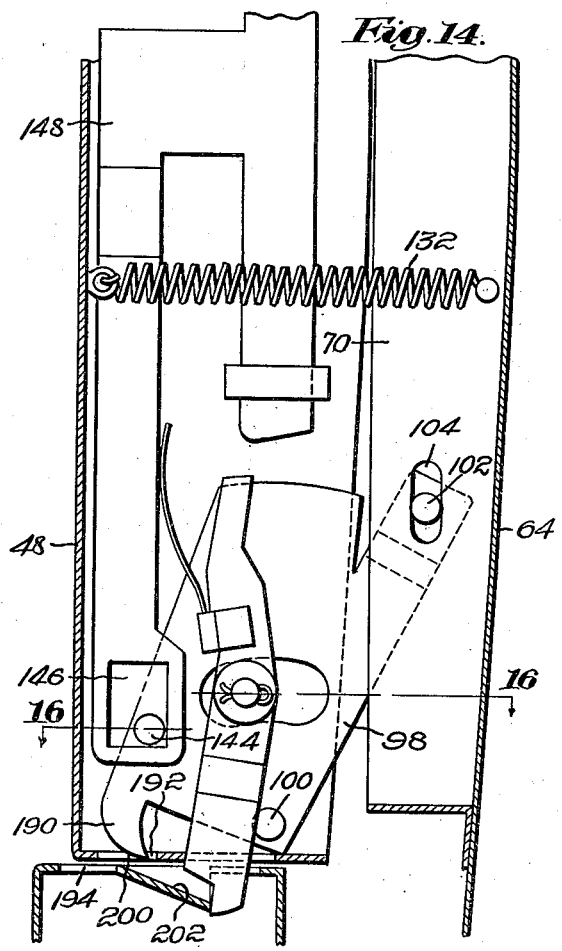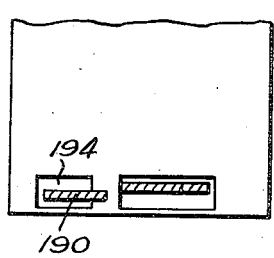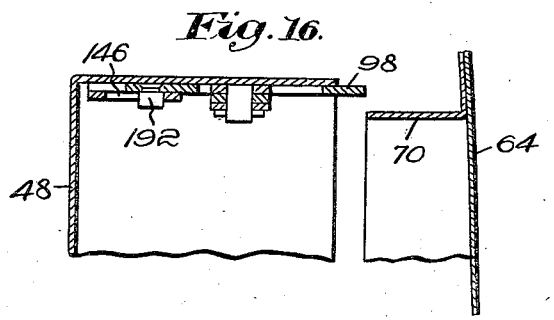

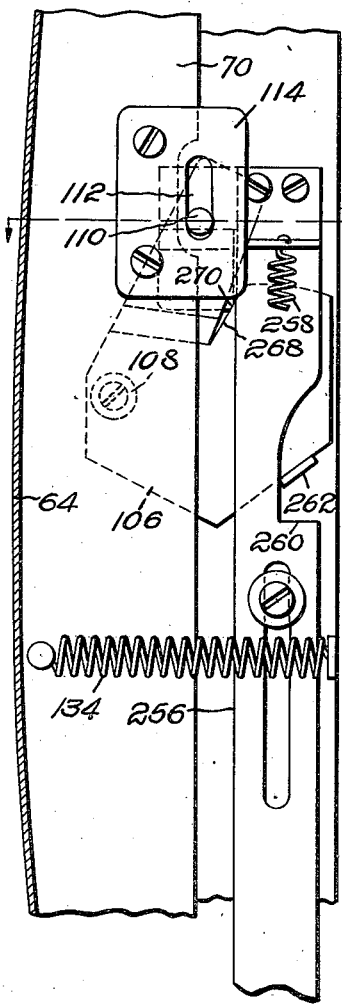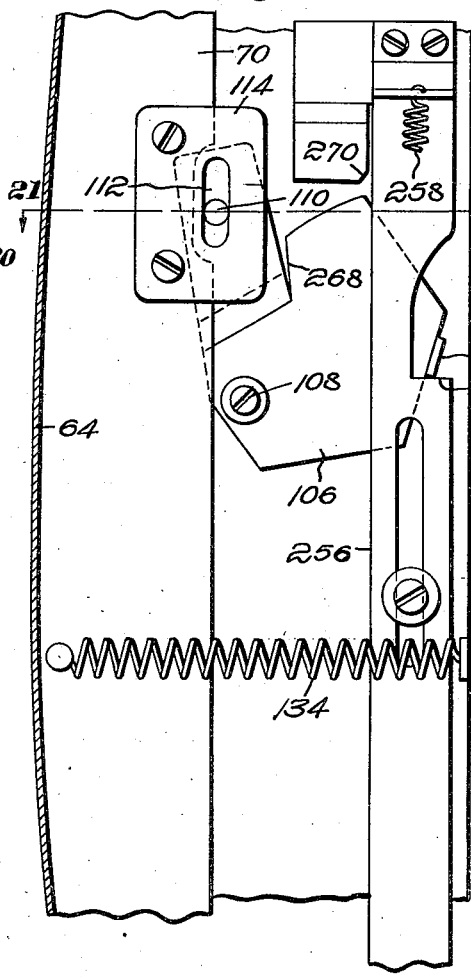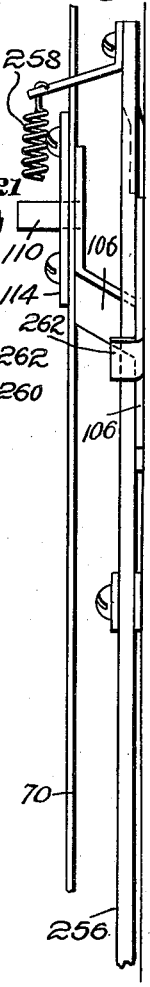

July 19, 1938. C. W. SHERMAN 2,124,170
DOOR STRUCTURE
Filed Nov. 21, 1936 9 Sheets-Sheet 7
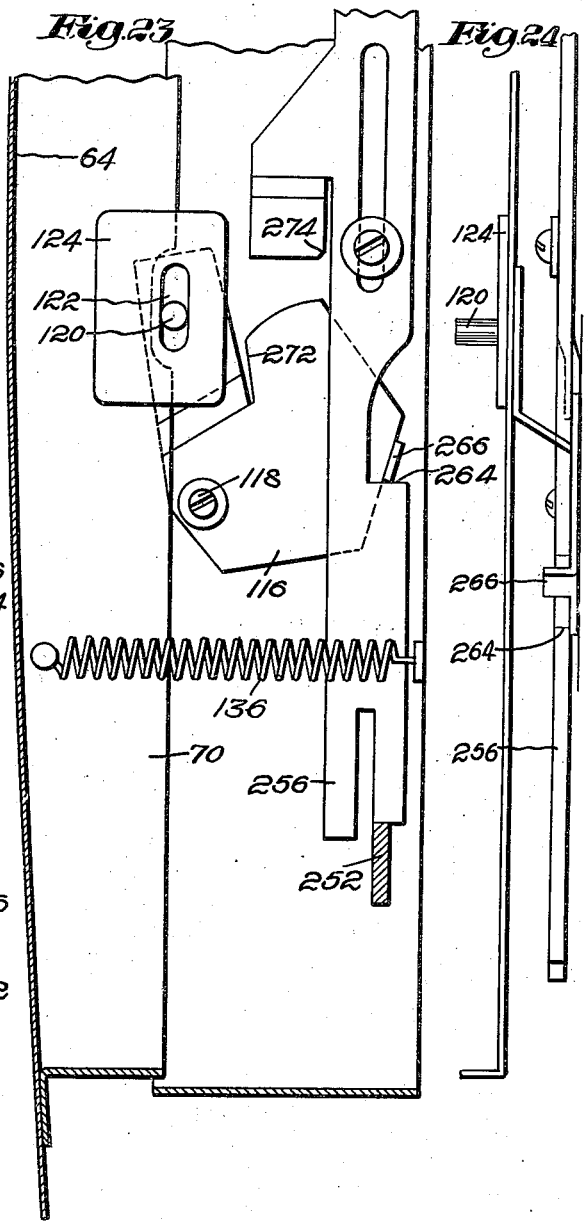

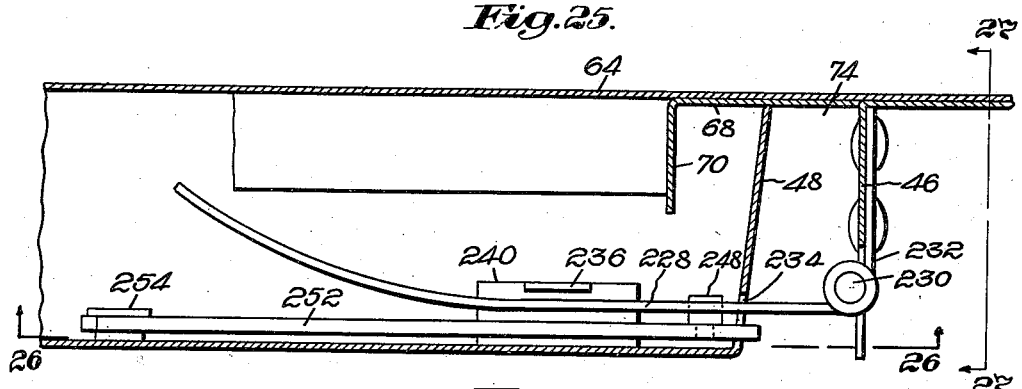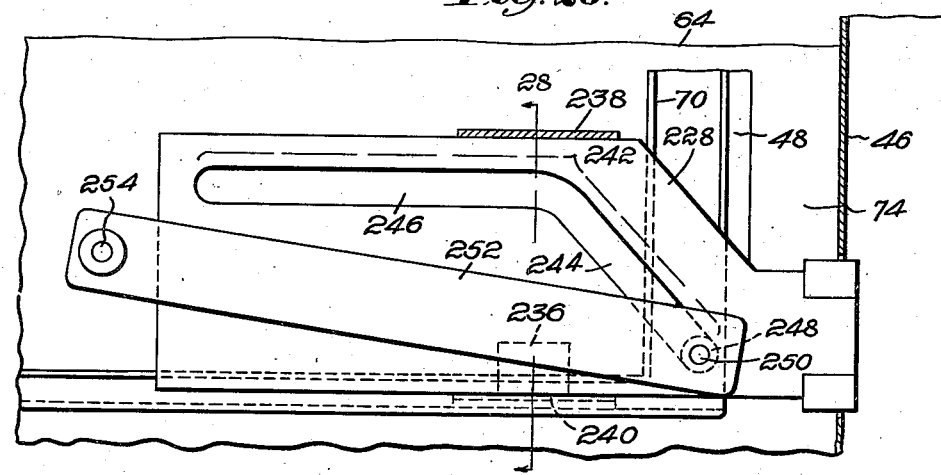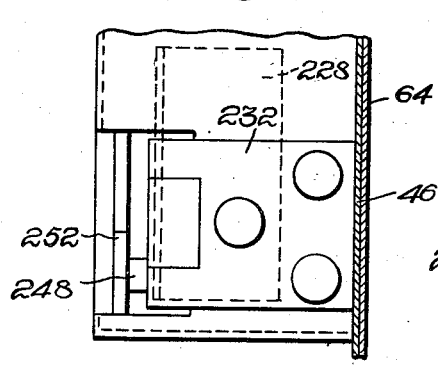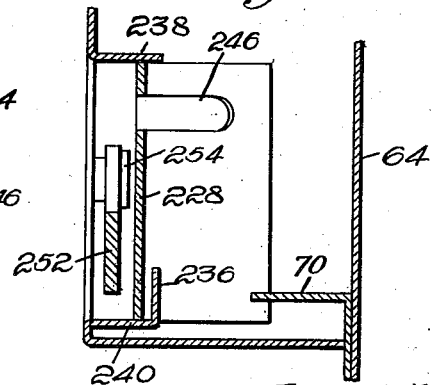

Charles W. Sherman
by Emery, Booth, Townsend, Miller & Weidner
Attys

Patented July 19, 1938

2,124,170

UNITED STATES PATENT OFFICE 2,124,170

DOOR STRUCTURE

Charles W. Sherman, Boston, Mass., assignor to himself and Leo C. Waible, Boston, Mass.

Application November 21, 1936, Serial No. 112,120

49 Claims. (Cl. 296—44)

This invention relates to a novel door structure particularly intended for motor vehicles. Automobile doors, as heretofore constructed, are open to the serious objection that fingers placed on a body-pillar at either the free edge of the door or the hinge edge are jammed and injured by being pinched or crushed between the pillar and the adjacent edge of the door when the latter is closed. The invention aims to provide a door structure constructed and arranged to prevent these injuries.

The invention will best be understood by reference to the following description of one embodiment of the invention, while its scope will be pointed out more particularly in the appended claims.

In the drawings:

Fig. 5 is a sectional view on an enlarged scale on line 5—5 of Fig. 4, showing the parts in the relative positions in which they appear when the door is locked;

Fig. 6 is a sectional view illustrating the same parts shown in Fig. 5 but in the relative positions in which they appear when the door is unlocked;

Fig. 7 is a sectional view on an enlarged scale on line 7—7 of Fig. 3;

Fig. 8 is a sectional view on an enlarged scale on line 8—8 of Fig. 3;

Fig. 9 is a sectional view on an enlarged scale on line 9—9 of Fig. 3;

Fig. 10 is a sectional view on an enlarged scale on line 10—10 of Fig. 3;

Fig. 11 is a sectional view on enlarged scale on line 11—11 of Fig. 3, showing the parts in the relative positions in which they appear when the door is locked;

Fig. 12 is a sectional view of the same parts shown in Fig. 11 but with the parts in the relative positions in which they appear when the door is unlocked;

Fig. 13 is a sectional view on line 13—13 of Fig. 3, showing the parts in the relative positions in which they appear when the door is locked;

Fig. 14 is a sectional view of the parts shown in Fig. 3, but showing the parts in the relative positions in which they appear when the door is unlocked;

Fig. 15 is a sectional view on line 15—15 of Fig. 13;

Fig. 16 is a sectional view on line 16—16 of Fig. 14;

Fig. 17 is a sectional view on an enlarged scale on line 17—17 of Fig. 3, showing the parts in the relative positions in which they appear when the door is locked;

Fig. 18 is a sectional view of the parts shown in Fig. 17, but with the parts in the relative positions in which they appear when the door is unlocked and partly open;

Fig. 19 is an elevation viewed from the right-hand side of Fig. 18;

Fig. 20 is a sectional view on line 20—20 of Fig. 17;

Fig. 21 is a sectional view on line 21—21 of Fig. 18;

Fig. 22 is a sectional view on an enlarged scale on line 22—22 of Fig. 3 showing the parts in the relative positions in which they appear when the door is locked;

Fig. 23 is a sectional view of the parts shown in Fig. 22, but with the parts in the relative positions in which they appear when the door is unlocked and partly open;

Fig. 24 is an elevation viewed from the right-hand side of Fig. 22;

Fig. 25 is a sectional view on an enlarged scale on line 25—25 of Fig. 3, showing the parts in the relative positions which they occupy when the door is closed;

Fig. 26 is a sectional view on line 26—26 of Fig. 25;

Fig. 27 is a sectional view on line 27—27 of Fig. 25;

Fig. 28 is a sectional view on line 28—28 of Fig. 26;

Figure 1:
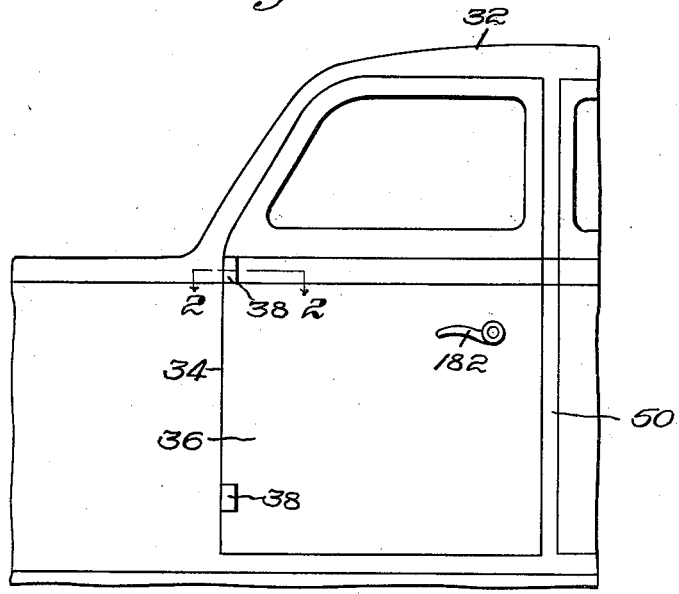
Fig. 1 is an elevation of a portion of the exterior of an automobile body having a door structure embodying the invention.
Figure 2:
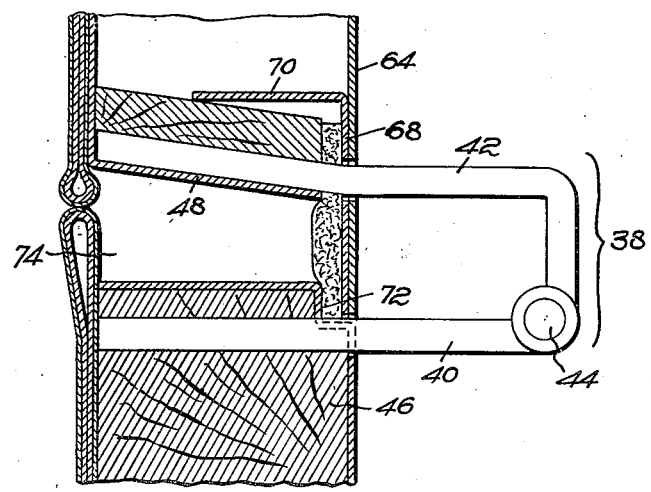
Fig. 2 is a sectional view on line 2—2 of Fig. 1 illustrating one of the hinges.

Referring to the drawings and to the embodiment of the invention illustrated therein by way of example, and having reference at first to Fig. 1, there is shown a portion of an automobile body 32 having a door opening 34 normally closed by a door 36 mounted on hinges 38, one of which is shown much enlarged in Fig. 2, comprising two hinged members 40 and 42 connected by a pintle 44, one member being secured to a hinge pillar 46 and the other to a door frame 48 presently to be described. At the opposite side of the door opening, there is another pillar 50 which in this case is the center pillar of the body.

Figure 3:
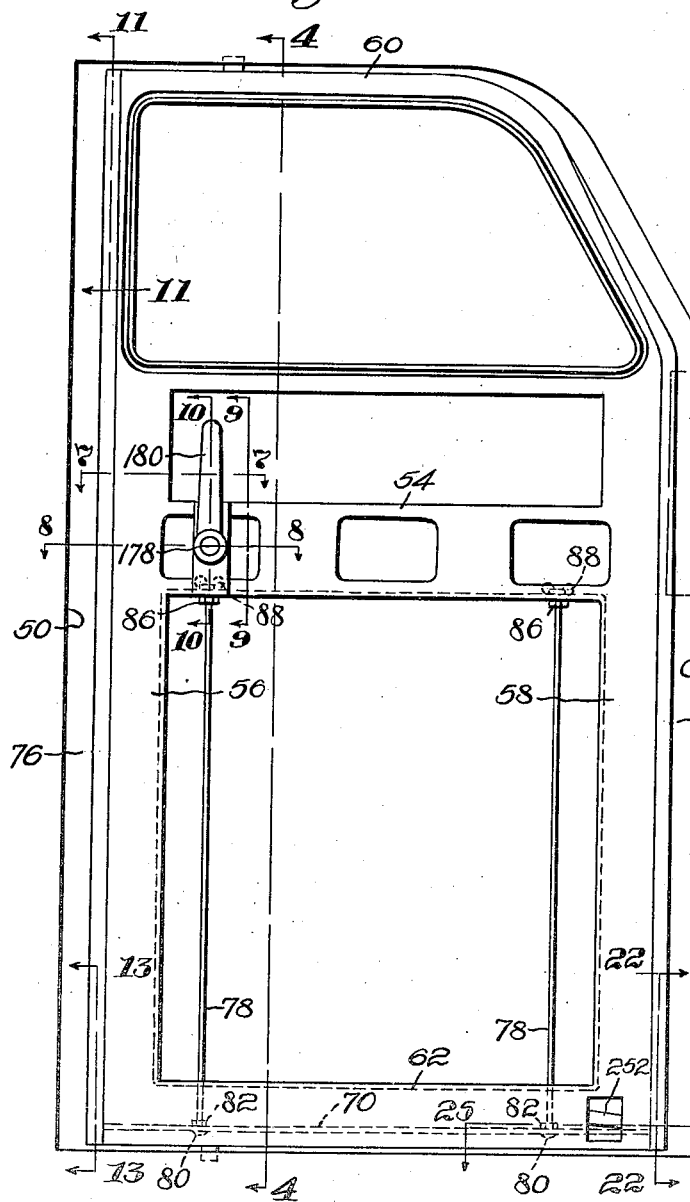
Fig. 3 is an elevation of the door structure as viewed from the interior of the body, those parts as are not essential to the illustration of the invention, such as upholstery, window glass and window operating mechanism being omitted.
Figure 4:
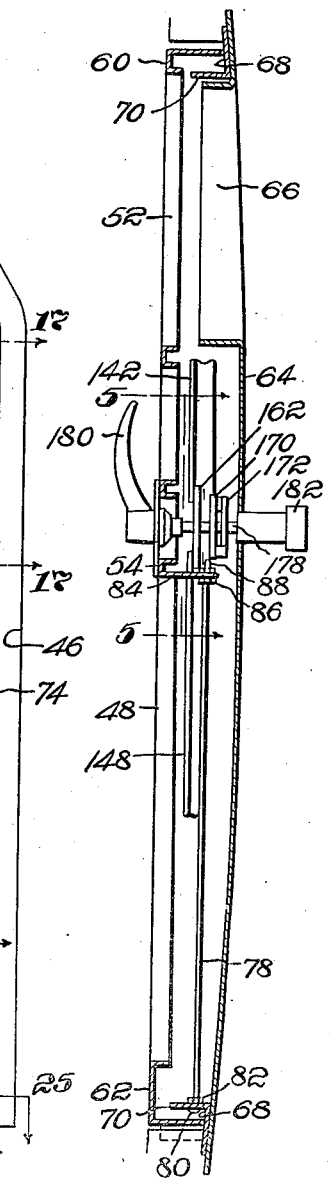
Fig. 4 is a sectional view on line 4—4 of Fig. 3.
Figure 29:
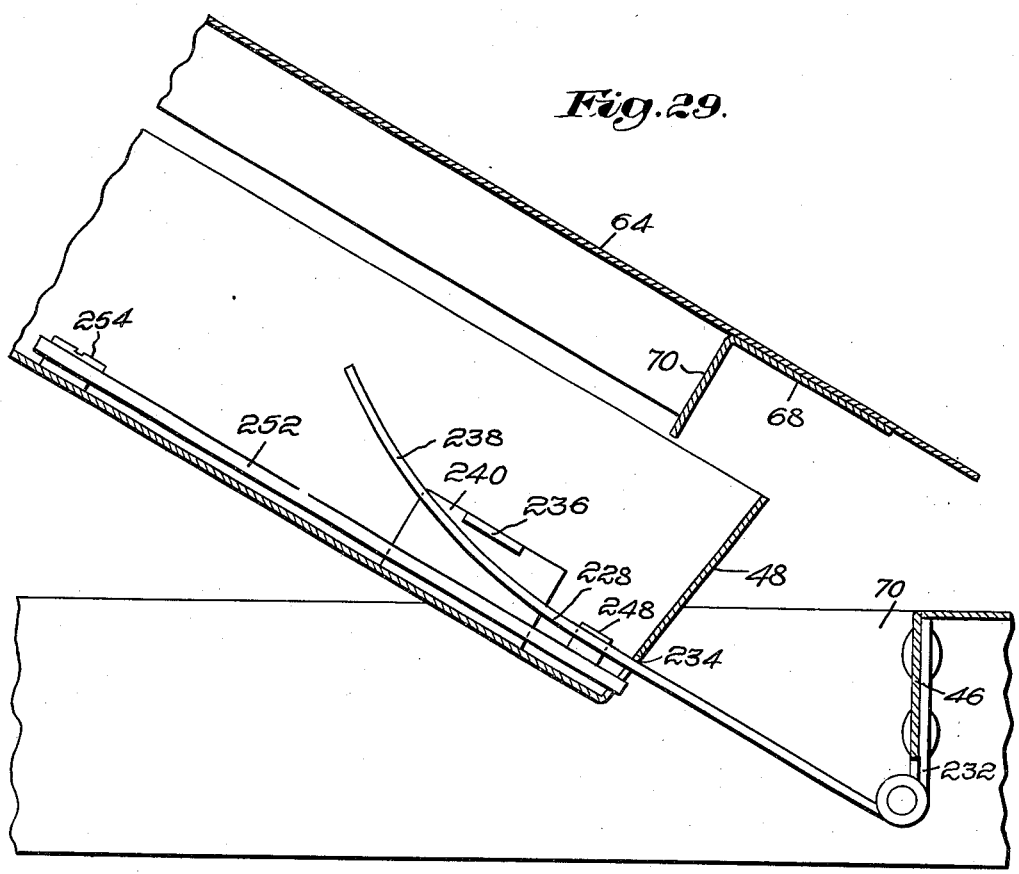
Fig. 29 is a sectional view similar to Fig. 25 but showing the parts in the relative positions which they occupy when the door is partly open.
Figure 30:
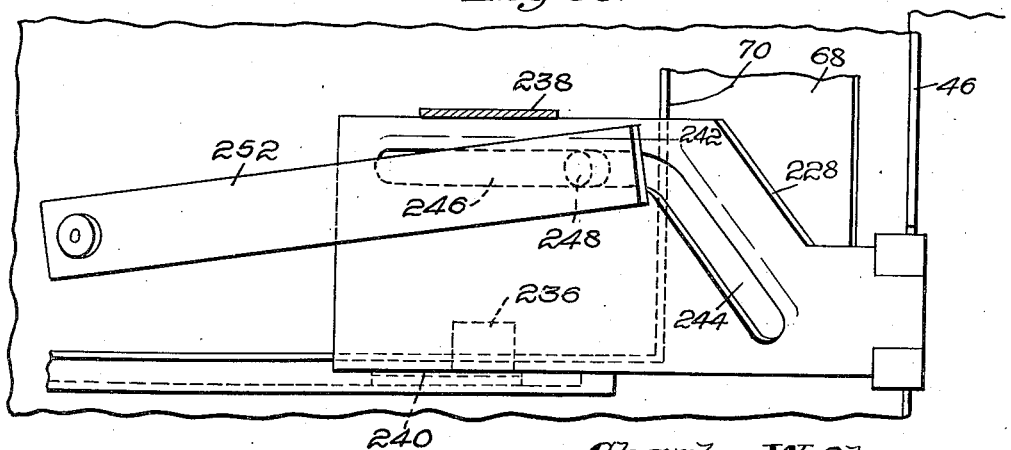
Fig. 30 is an elevation of the parts shown in Fig. 29.

The door frame will now be described, reference being had to Figs. 3 and 4. The frame shown by way of example is a one-piece steel stamping having a window opening 52 (see Fig. 4) below which is a rail 54 connecting a door lock pillar 56 and a door hinge pillar 58, the pillars being connected at the top by a header bar 60 and at the bottom by a bottom bar 62. The door comprises also a door panel 64, herein a one-piece steel stamping provided with a window opening 66 (see Fig. 4) and suitably secured to the panel as by welding is an angle bar 68 having an inwardly directed flange 70. The margin of the door panel overlaps the margin of the door opening, and as is usual with modern automobiles, the door opening has a rabbet 72 (see Fig. 2) which receives the margin of the panel so as to present a flush appearance of the face of the body and the face of the door panel at least along the vertical edges of the panel and usually along the top also, although in at least some cases there is no rabbet at the bottom. However, the rabbet is a matter of no moment.

In automobile doors as heretofore constructed, the door panel is rigidly secured to the door frame, but this invention contemplates making the panel as a separate and distinct element carried by but movably connected to the frame for movement toward and from the latter. This movable relationship is made use of in order to permit the frame to move to its fully closed position and the panel to be stopped by an obstruction such as the fingers of a person.

Furthermore, in automobile doors as heretofore constructed, the door fully fills the door opening, but this invention contemplates the provision of spaces sufficiently wide to receive the fingers along at least the two vertical edges of the door opening, although none are needed at the top and bottom of the door as it is extremely unlikely that a person would place his fingers at the top or bottom. In the present example, finger spaces 74 and 76 (see Fig. 3) are provided between the vertical edges of the door frame 48 and the pillars 46 and 50. Now, therefore, since there are finger spaces between the door frame and the stationary pillars of the body, and since the panel is capable of outward movement with relation to the door frame, there is a basis for an arrangement in which the fingers cannot be crushed between the door frame and the body pillars.

A further desirable characteristic is that the door panel be yieldingly or resiliently connected to the door frame so that normally the panel and the frame shall move in unison as if they were made as a unit construction. It is also desirable that if no obstruction such as fingers be present, and when the door is locked, the panel be locked to the door frame. The ways in which these desirable objects are attained will appear in the course of the following description.

Naturally, as the door panel is to be susceptible of movement toward and from the door frame, suitable means must be provided for supporting the panel on the frame, and to this end in the present example the panel is supported by two rods 78 suitably attached to the panel and to the door frame. In the example shown, each rod is provided at its lower end with a head 80 below the flange 70 of the angle bar 68, and the rod extends upwardly through said flange and is threaded to receive a nut 82. The upper end of the rod extends through a flange 84 on the rail 54 and is threaded to receive two nuts 86 and 88, one below and the other above the flange. This arrangement enables the rod to be adjusted vertically to determine the height of the door panel. The rods should be sufficiently slim and flexible to permit the necessary freedom of action of the door panel as it is moved toward and from the door frame.

The door panel and the door frame are further connected to each other at all four corners as by four pivoted members now to be described, reference being had at first to Figs. 11 and 12. Considering first the upper corner of the free edge of the door, there is a lever 90 fulcrumed on a pivot 92 on the door frame and carrying a pin 94 working in a vertical slot 96 in the flange 70 on the door panel. Rocking of this lever will move this corner of the door panel toward and from the door frame. Considering now the lower corner of the free edge of the door, and referring to Figs. 13 and 14, there is a similar but inverted lever 98 fulcrumed on a pivot 100 on the door frame and carrying a pin 102 working in a slot 104 in the flange 70. Rocking of this lever will move this corner of the door panel toward and from the door frame.

Considering now the upper corner of the hinge edge of the door, and referring to Figs. 17 and 18, there is a lever 106 fulcrumed on a pivot 108 on the door frame and carrying a pin 110 working in a vertical slot 112 in a plate 114 secured to the flange 70, although the plate might just as conveniently be made as an integral part of the flange. Rocking of this lever will move this corner of the door panel toward and from the door frame. Considering lastly the lower corner of the hinge edge of the door and referring to Figs. 22 and 23, there is a lever 116 fulcrumed on a pivot 118 on the door frame and carrying a pin 120 working in a vertical slot 122 in the plate 124 secured to the flange 70, although in this case also the plate might just as conveniently be made as an integral part of the flange.

The door panel is connected to the door frame by resiliently yieldable means such as those now to be described, reference being had at first to Figs. 11 and 12 which show the upper portion of the free edge of the door. In the example shown, the panel is connected to the frame by a spring 126 secured at one end to a pin 128 on the flange 70, and at the other end to a pin 130 on the frame 48. In like manner, at the lower portion of the free edge of the door, a spring 132 connects the panel to the frame. Similarly, at the hinge edge of the door there is a spring 134 (see Figs. 17 and 18) and a spring 136 (see Figs. 22 and 23) connecting the panel to the frame. These several springs normally maintain the panel against the frame, but are capable of yielding to allow the panel to move outwardly with relation to the frame.

The mechanism for swinging the upper and lower levers 90 and 98 in opposition to the springs 126 and 132 will now be described, reference being had at first to Figs. 11 and 12. On the lever 90 (see Fig. 11) is a pin 138 which is loosely received in an opening 140 in a vertically movable slide 142. Similarly, on the lever 98 (see Fig. 14) is a pin 144 loosely received in an opening 146 in a vertically movable slide 148. The upper slide can be moved downwardly and the lower slide upwardly in unison by manually operable mechanism now to be described, reference being had at first to Fig. 5. The upper slide 142 provided with a rigid arm 150 and the lower slide 148 is provided with a rigid arm 152, one carrying a pin 154 with a roller 156 thereon and the other carrying a pin 158 with a roller 160 thereon. A rocking cam plate 162 turning about a horizontal axis is provided with an arcuate slot 164 which receives the roller 156 and with a like but reversely arranged slot 166 which receives the roller 160. These slots slope outwardly from the axis of the cam plate and are arranged somewhat like spirals.

When, therefore, the cam-plate is turned clockwise from the position shown in Fig. 5 to the position shown in Fig. 6, the slides 142 and 148 are caused to travel toward each other. When this occurs, the upper edge of the opening 140 (see Fig. 12) in the upper slide 142 will engage the pin 138 on the lever 90 and will rock the latter to the position shown in Fig. 12, thus moving the upper corner of the panel 64 outwardly. In like manner, when the lower slide 148 rises (see Fig. 14) the lower edge of the opening 146 will engage the pin 144 on the lever 98 and rock the latter to move the lower corner of the panel outwardly.

The mechanism for operating the cam plate 162 will now be described, reference being had at first to Fig. 9. The cam plate is secured as by studs 168 to a bar 170 which normally stands in the oblique position shown in Fig. 5, but it may be rocked to the position shown in Fig. 6 by a second bar 172 which is provided at two diagonally opposite corners with lugs 174 which, as shown in Fig. 9, overlie opposite edges of the bar 170. When, therefore, the bar 172 is rocked clockwise as viewed in Figs. 5 and 6, the lugs 174 which are normally spaced from the edges of the bar 170 engage said edges and carry the bar 170 along to the position shown in Fig. 6 in opposition to a spring 176 connecting the lower end of the cam 162 to the door frame 48.

The bar 172 is fixedly secured to a shaft 178 to the inner end of which is attached a handle 180 (see Fig. 4), while a second handle 182 is secured to the outer end of the shaft. By grasping either handle, the shaft may be rocked a quarter turn clockwise as viewed from the inner side of the door, against the yielding resistance presented by the spring 176.

The locking of the door to the body will now be described, reference being had at first to Fig. 11. The lever 90 is provided with a latch 184 which normally projects upwardly through an opening 186 in the door frame into an opening 188 in the car body and thus locks the top of the door frame to the car body. In like manner, the bottom of the door frame is normally locked to the car body (see Fig. 13) by providing the lower lever 98 with a latch 190 which projects downwardly through an opening 192 in the door frame into an opening 194 in the car body.

Referring once more to Fig. 11, the latch 184 is provided with a curved, sloping surface 196, and the car body is provided with a downwardly and inwardly sloping surface 198 on which the sloping surface 196 of the latch will ride as the door closes, thus causing the latch to recede downwardly until it arrives in registration with the opening 188 which it will enter because the pull of the spring 126 on the door panel 64 acts through the slot 96 and pin 94 to rock the lever 90 (of which the latch 184 is a part) into the normal position shown in Fig. 11.

Referring now to Fig. 13, the latch 190 is provided with a curved, sloping surface 200, and the car body is provided with an upwardly and inwardly sloping surface 202 on which the sloping surface 200 of the latch will ride as the door closes, thus causing the latch to recede upwardly until it arrives in registration with the opening 194 which it will enter because the pull of the spring 132 on the door panel 64 acts through the slot 104 and pin 102 to rock the lever 98 (of which the latch 190 is a part) into the normal position shown in Fig. 13.

Returning now to Fig. 11, the lever 90 which carries the latch 184 is normally locked in the position shown by providing the same with an upwardly and outwardly sloping locking surface 204 which is normally engaged by a locking surface 206 on the slide 142. When, therefore, the slide is in its uppermost position, the lever 90 is locked and prevented from swinging outwardly, and furthermore the slope of the surface 204 is such that the upward thrust of the slide tends to cause the lever 90 to draw the panel 64 inwardly toward the frame 48.

When, however, the slide 142 is drawn downwardly, its locking surface 206 is withdrawn from the locking surface 204 of the lever, thus freeing the latter. It is to be noted that the vertical dimension of the opening 140 in the slide is such that a free play or lost motion is provided between the slide 142 and the lever 90. When, therefore, the slide descends, the lever is first unlocked and then the upper edge of the opening 140 descends upon the pin 138 and rocks the lever 90 to the position shown in Fig. 12, thus moving the panel 64 outwardly with relation to the frame 48.

When now the door handle is released and the slide 142 rises, the slide cannot ascend to its normal position shown in Fig. 11 because its ascent is arrested by locking means now to be described. A slide locking lever 208 is fulcrumed on a pivot, herein a stud 210, on the door frame 48 and this pivot is surrounded by a spacing washer 212 whose thickness is such as to prevent the lever from being pinched against the lever 90, and the latter is provided with an arcuate slot 214 about the washer, the arc being struck from the center of the fulcrum 92.

The locking lever 208 carries a leaf spring 216 which rests against a vertical surface 218 on the slide 142 and constantly tends to rock the lever contra-clockwise and to swing its upper end toward the left. The upper end of the lever has a surface 220 which, as shown in Fig. 11, normally rests against a surface 222 presented by the car body. During the opening movement of the door, the spring 216 rocks the lever 208 contraclockwise and brings a surface 224 at its lower end into a position directly above a surface 226 on the slide 142. When, therefore the handle is released and the slide rises, upward movement of the latter is arrested by engagement of its surface 226 with the surface 224 at the lower end of the lever 208. The lever therefore locks the slide and the later cannot rise far enough for its locking surface 206 to reengage the locking surface 204 on the lever 90. However, the panel 64 will be drawn against the frame 48 by the spring 126, but the panel will not be locked to the frame.

Let it now be supposed that the door is to be closed either by slamming it or by pulling inwardly on the inner handle. When the sloping surface 196 of the latch 184 encounters the sloping surface 198 on the body, as the closing of the door continues and the latch rides down the sloping surface 198, the lever 90 is rocked outwardly on its fulcrum 92 and the pin 94 working in the slot 96 thrusts the panel 64 outwardly with relation to the frame 48. In the meantime, the slide 142 is restrained against upward movement, at first, by engagement of its surface 226 with the surface 224 on the lower end of the locking lever 208.

As the inward movement of the door continues, the outward rocking movement of the lever 90 continues. The lower end of the lever is provided with an arcuate surface 227 formed on an arc struck from the center of the fulcrum 92. This surface now swings above and across the surface 226 on the slide 142. When, therefore, the surface 220 at the upper end of the locking lever 208 encounters the surface 222 on the body and the locking lever is swung to carry the surface 224 at its lower end inwardly from the surface 226 on the slide, the latter still is not free to rise because the surface 226 on the slide now encounters the arcuate surface 227 on the lever 90.

Now, let it be assumed that a person has placed his fingers on the adjacent body pillar, partly in the space between the pillar and the door frame and partly in the path of the margin of the door panel. It will be remembered that the door panel is still held outwardly from the door frame. When, therefore, the door frame reaches its fully closed position, the latch 184 registers with the opening 188 in the body and the lever 90 is free to swing inwardly toward its normal position represented in Fig. 11 except for the obstruction presented by the fingers. However, the slide 142 still cannot rise under the influence of the handle controlling spring 176 because the arcuate surface 227 still blocks the slide.

It follows that the handle controlling spring 176 cannot add its force to the panel controlling spring 126 and that only the force of the latter will cause the margin of the panel to press against the fingers. During the closing of the door, the momentum of the panel has been entirely overcome because it has been stopped before it has reached a position where it can contact with the fingers. This is because, during inward movement of the frame 48, the surface 196 on the latch 184 rides downwardly on the surface 198, thus rocking the lever 90 and causing the latter to move the panel 64 outwardly with relation to the frame 48. The result is that the panel 64 then remains stationary with relation to the car body during continued inward movement of the frame 48 with relation to the car body.

When now, the panel moves inwardly under the pull of the spring 126, after the fingers have been removed, the mechanism is restored to the normal position shown in Fig. 11 and the door frame is locked to the body and the panel is locked to the door frame.

The mechanism which has just been described in connection with the top of the free edge of the door is duplicated at the bottom (see Figs. 13 and 14) except that the mechanism at the bottom is inverted as compared with the mechanism at the top. Accordingly, it is deemed unnecessary to describe the bottom mechanism as its operation should be obvious.

The mechanism for operation of the panel at the hinge edge of the door will now be described, reference being had at first to Figs. 25 to 28 inclusive. It should be stated at the outset that the construction and arrangement of this mechanism is such that the swinging movement of the door frame is utilized to cause movement of the door panel toward and from the frame. That portion of the mechanism illustrated in Figs. 25 to 28 inclusive is intended to be located below the level of the floor of the car body, although the floor is not shown because it is not deemed necessary to a proper understanding of the invention.

Referring at first to Fig. 25, a cam plate 228 is suitably hinged to the pillar 46 to swing about a vertical axis, as by a pintle 230 and a hinge member 232 affixed to the pillar. The cam plate extends through a slot 234 in the frame 48 and it is rather loosely restrained by a lug 236 upstanding from the bottom of the frame, the arrangement being such that as the frame swings on its hereinbefore described hinges, the cam plate 228 also swings on its pintle 230. A lug 238 on the frame 48 above the cam plate and a flange 240 on the flange below the cam plate enable the latter to resist vertical stresses applied to the cam plate. As shown in Fig. 25, the free end of the cam plate curves toward the door panel.

The cam plate is provided with a cam slot 242 having an oblique, active portion 244 and a horizontal, dwell portion 246. Working in this slot, is a cam roller 248 mounted on a stud 250 on a lever 252 which is pivoted on a stud 254 on the bottom bar 62 of the door frame 48. Accordingly, as the cam plate 228 swings horizontally in an outward direction under the influence of the door frame, the roller at first traverses the oblique portion of the cam slot and lifts the lever, and when the roller reaches the dwell, the lever remains stationary as the roller traverses the dwell.

Vertical movement of the lever 252 is utilized to impart a corresponding vertical movement to a slide 256 (see Figs. 22 and 23) resting upon the lever, and yieldingly urged downwardly by a spring 258 (see Figs. 17 and 18) attached at its upper end to the slide and at its lower end to the horizontal rail 54. Vertical movement of the slide 256 is utilized to rock the upper lever 106 as by providing the slide with a horizontal ledge 260 to engage a lug 262 on the lever, and to rock the lower lever 116 (in Figs. 22 and 23) by providing the slide with a ledge 264 to engage a lug 266 on the lower lever.

The slide 256 is also utilized normally to lock the upper and lower levers 106 and 116 in a manner similar to that already described in connection with the locking of the corresponding levers at the free edge of the door. To this end, the upper lever (see Fig. 17) is provided with an upwardly and outwardly sloping surface 268 normally engaged by a locking surface 270 on the slide 256, the arrangement being such that, not only is the lever locked, but it is also drawn inwardly and thus draws the panel inwardly against the frame. So also, the lower lever 116 is provided with a sloping surface 272 (see Figs. 22 and 23) normally engaged by a locking surface 274 on the slide 256.

It should now be evident that when the door is closed, the panel near the hinge edge is locked to the frame, and that when the door is opened, the panel is first unlocked and is then thrust outwardly from the frame to the extent caused by the oblique, active portion of the cam. When the cam roller reaches and traverses the dwell of the cam, during continued outward swinging of the door, the panel will be maintained in fixed relationship with the frame.

Now let it be supposed that when the door is open, a person places his fingers between the rear margin of the door panel and the hinge pillar of the body and that somebody closes the door. When the margin of the panel contacts the fingers, the spring 258 will yield and the slide 256 cannot then swing the upper and lower levers 106 and 116 because there is a non-positive connection between the slide and the lever 252. As a result, the slide will remain elevated and the levers will be influenced only by the stressing of the spring 258 whose tension is so light that serious injury to the fingers is avoided. When, now, the panel moves inwardly under the pull of the spring 134 after the fingers have been removed, the mechanism is restored to the normal position shown in Figs. 17 and 22 and the door frame is locked to the body and the panel is locked to the door frame.

It should now be evident that the control of the panel at the hinge edge of the door is automatic, since it is dependent upon the swinging of the door. Likewise, the control is automatic at the free edge except for that movement of the panel which is incidental to the unlatching of the door upon the turning of the door handle. However, at either edge insertion of the fingers in the finger space between the door frame and the adjacent pillar serves as an obstruction to complete closing of the door panel. Nevertheless, when no obstruction is present and when the door is fully closed, the panel is securely locked to the frame.

Having thus described one embodiment of the invention but without limiting myself thereto, what I claim and desire by Letters Patent to secure is:

1. In a door structure, the combination of a body having a door opening, a hinged door frame normally received within said opening, and a door panel supported by and movably connected to said frame for movement toward and from the latter, said panel having a marginal portion extending beyond said frame and overlapping a marginal portion of said opening.

2. In a door structure, the combination of a body having a door opening, and a door normally closing said opening, said door comprising an inner part hinged to said body and an outer part supported by said inner part, overlapping a margin of said opening and arranged to move toward and from said inner part.

3. In a door structure, the combination of a body having a door opening, and a door normally closing said opening, said door comprising an inner part hinged to said body, an outer part carried by said inner part and overlapping a margin of said opening, and resiliently yieldable means connecting said parts and arranged to permit said inner part to move to its fully closed position when an obstruction is placed between said outer part and a margin of said opening.

4. In a door structure, the combination of a body having a door opening, and a hinged door normally closing said opening, said door comprising inner and outer resiliently connected parts, said outer part having a marginal portion which normally contacts with said body and is arranged to be stopped by an obstruction during its closing movement while said inner part continues its closing movement.

5. In a door structure, the combination of a body having a door opening, and a door normally closing said opening, said door comprising a part hinged to said body, a second part supported and carried by the first part, and a plurality of pivoted members connecting said parts and arranged to permit relative inward and outward movement of said parts.

6. In a door structure, the combination of a body having a door opening, and a door normally closing said opening, said door comprising an inner part hinged to said body, the outer part carried by the first part, a plurality of members connecting said parts and arranged to permit their relative inward and outward movement, and resilient means arranged to cause said outer part yieldingly to follow said inner part during the closing movement of the latter.

7. In a door structure, the combination of a body having a door opening, and a door normally closing said opening, said door comprising an inner part hinged to said body, an outer part carried by said inner part, a plurality of members supported by said inner part and connected to said outer part, and means connected to said members to cause them to move said outer part toward and from said inner part.

8. In a door structure, the combination of a body having a door opening, and a door normally closing said opening, said door comprising an inner part hinged to said body, an outer part carried by said inner part, a plurality of members supported by said inner part and connected to said outer part, and means connected to said members to cause them to move said outer part toward and from said inner part, said means including a door handle.

9. In a door structure, the combination of a body having a door opening, and a door normally closing said opening, said door comprising an inner part hinged to said body, an outer part carried by said inner part, a plurality of members supported by said inner part and connected to said outer part, and means connected to said members to cause them to move said outer part toward and from said inner part, said means including a part operated by the swinging of said inner part.

10. In a door structure, the combination of a body having a door opening, and a door normally closing said opening, said door comprising an inner part hinged to said body, an outer part carried by said inner part, a first pair of members supported by said inner part and connected to said outer part adjacent to the free edge, a second pair of members supported by said inner part and connected to said outer part adjacent to the hinge edge, means including a door handle connected to the first pair of members to cause them to move said outer part toward and from said inner part, and means including a part connected to the second pair of members and operated by swinging of said inner part to cause said second pair of members to move said outer part toward and from said inner part.

11. In a door structure, the combination of a body having a door opening, and a door normally closing said opening, said door comprising an inner part hinged to said body, an outer part carried by said inner part and normally contacting a margin of said opening, and parallel motion mechanism connecting said outer part to said inner part and arranged to move said outer part toward and from said inner part.

12. In a door structure, the combination of a body having a door opening, and a door normally closing said opening, said door comprising an inner part hinged to said body, an outer part carried by said inner part and normally contacting a margin of said opening, parallel motion mechanism connecting said outer part to said inner part and arranged to move said outer part toward and from said inner part, and resilient means tending to move said outer part toward said inner part.

13. In a door structure, the combination of a body having a door opening, and a door normally closing said opening, said door comprising an inner part hinged to said body, an outer part carried by said inner part and normally contacting a margin of said opening, parallel motion mechanism connecting said outer part to said inner part and arranged to move said outer part toward and from said inner part, resilient means tending to move said outer part, toward said inner part, and mechanism to move said outer part from said inner part against the yielding opposition of said resilient means.

14. In a door structure, the combination of a body having a door opening, and a door normally closing said opening, said door comprising an inner part hinged to said body, an outer part carried by said inner part and normally contacting a margin of said opening, parallel motion mechanism connecting said outer part to said inner part and arranged to move said outer part toward and from said inner part, resilient means tending to move said outer part toward said inner part, and mechanism to move said outer part from said inner part against the yielding opposition of said resilient means, the last mentioned mechanism including a door handle and a part operated by swinging of said inner part.

15. In a door structure, the combination of a body having a door opening, and a hinged door normally closing said opening, said door comprising inner and outer parts, one carried by the other and one movable inwardly and outwardly toward and from the other, resilient means tending to move said outer part toward said inner part, and locking means normally locking said inner part to said body and said outer part to said inner part.

16. In a door structure, the combination of a body having a door opening, and a hinged door normally closing said opening, said door comprising inner and outer parts, one carried by the other and one movable inwardly and outwardly toward and from the other, resilient means tending to move said outer part toward said inner part, a first locking means normally locking said inner part to said body, a second locking means normally locking said outer part to said inner part, a door handle, and means operated by said handle to cause the unlocking of said outer part and the unlocking of said inner part.

17. In a door structure, the combination of a body having a door opening, and a hinged door normally closing said opening, said door comprising inner and outer parts, one carried by the other and one movable inwardly and outwardly toward and from the other, resilient means tending to move said outer part toward said inner part, a first locking means normally locking said inner part to said body, a second locking means normally locking said outer part to said inner part, a door handle, and means operated by said handle to cause the unlocking of said outer part, the unlocking of said inner part, and the moving of said outer part outwardly with relation to said inner part in opposition to said resilient means.

18. In a door structure, the combination of a body having a door opening, and a hinged door normally closing said opening, said door comprising inner and outer parts, one movable inwardly and outwardly toward and from the other, resilient means tending to move said outer part toward said inner part, locking means normally locking said outer part to said inner part, and means consequent upon outward swinging of said inner part to cause the unlocking of said outer part.

19. In a door structure, the combination of a body having a door opening, and a hinged door normally closing said opening, said door comprising inner and outer parts, one movable inwardly and outwardly toward and from the other, resilient means tending to move said outer part toward said inner part, locking means normally locking said outer part to said inner part, and means consequent upon outward swinging of said inner part to cause the unlocking of said outer part, and the moving of said outer part outwardly with relation to said inner part in opposition to the resistance of said resilient means.

20. In a door structure, the combination of a body having a door opening, a hinged door frame normally received in said opening and having at least one edge separated from the corresponding edge of said opening by a finger-receiving space, and a door panel supported by said frame and having a marginal portion overlapping said space and mounted to move toward and from said frame.

21. In a door structure, the combination of a body having a door opening, a hinged door frame normally received in said opening and having at least one edge separated from the corresponding edge of said opening by a finger-receiving space, a door panel having a marginal portion overlapping said space, means supporting said panel on said frame for movement toward and from said frame, a spring tending to move said panel toward said frame, a member connecting said panel to said frame, and arranged to move said panel from said frame in opposition to said spring, actuating means to actuate said member to cause the same to move said panel from said frame, locking means to lock said member to prevent the same from moving said panel from said frame, and operating means connected to said locking means and to said actuating means to cause first the unlocking of said member and then the movement of said member to move said panel from said frame.

22. In a door structure, the combination of a body having a door opening, a hinged door frame normally received in said opening and having at least one edge separated from the corresponding edge of said opening by a finger-receiving space, a door panel having a marginal portion overlapping said space, means supporting said panel on said frame for movement toward and from said frame, a spring tending to move said panel toward said frame, a member connecting said panel to said frame, and arranged to move said panel from said frame in opposition to said spring, an actuator normally locking said member to prevent the same from moving said panel from said frame, and a lost-motion connection between said actuator and said member arranged to actuate said member after said actuator unlocks said member.

23. In a door structure, the combination of a body having a door opening, a hinged door frame normally received in said opening and having at least one edge separated from the corresponding edge of said opening by a finger-receiving space, a door panel having a marginal portion overlapping said space, means supporting said panel on said frame for movement toward and from said frame, a spring tending to move said panel toward said frame, a member connecting said panel to said frame and arranged to move said panel from said frame in opposition to said spring, an actuator normally locking said member to prevent the same from moving said panel from said frame, a lost-motion connection between said actuator and said member arranged to actuate said member to move said panel from said frame after said actuator unlocks said member, and locking means including a locking member which, in the normal, closed position of the door, engages said body and is thereby held out of the path of said actuator, and a spring which moves said locking member into the path of said actuator and prevents said actuator from actuating the first named member when said door frame is moved outwardly from its normal position.

24. In a door structure, the combination of a body having a door opening, a hinged door frame normally received within said opening and having at least one edge separated from the corresponding edge of said opening by a finger-receiving space, a door panel having a marginal portion overlapping said space, means supporting said panel on said frame for movement toward and from said frame, a spring tending to move said panel toward said frame, a lever fulcrumed on said frame and connected to said panel to move said panel from said frame in opposition to said spring, a latch carried by said lever and normally interengaged with said body to hold said frame in its closed position, a slide having a locking surface which normally engages said lever and prevents said lever from swinging, a lost-motion connection between said slide and said lever arranged to swing said lever to move said panel from said frame after said locking surface is withdrawn from its engagement with said lever, a locking lever fulcrumed between its ends on said frame and having one end which normally engages said body and thereby holds the second end of such lever out of the path of said slide, a spring which acts on said locking lever to move the second end of said locking lever into the path of said slide when said door frame is moved outwardly from its normal position, and a handle mechanism mounted on said frame and including a cam plate connected to said slide, a handle, a shaft to which said handle is secured, a spring connected to said shaft yieldingly resisting turning of said shaft and said handle, and means connecting said shaft to said cam plate to cause turning of said shaft in opposition to the last mentioned spring to be accompanied by turning movement of said cam plate and to cause said cam plate to move said slide to unlock and to swing the first mentioned lever.

25. In a door structure, the combination of a body having a door opening, a hinged door frame normally received within said opening and having at least one edge separated from the corresponding edge of said opening by a finger-receiving space, a door panel having a marginal portion overlapping said space, means supporting said panel on said frame for movement toward and from said frame, a lever fulcrumed on said frame and connected to said panel to move said panel from said frame in opposition to said spring, said lever being provided with an arcuate surface formed on an arc struck from the center of its fulcrum, a latch carried by said lever and normally interengaged with said body to hold said frame in its closed position, a slide having a locking surface which normally engages said lever and prevents said lever from swinging, said slide having a second surface to engage said arcuate surface to limit movement of said slide toward its normal position, a lost-motion connection between said slide and said lever arranged to swing said lever to move said panel from said frame after said locking surface is withdrawn from its engagement with said lever, a locking lever fulcrumed between its ends on said frame and having one end which normally engages said body and thereby holds the second end of such lever out of the path of said slide, a spring which acts on said locking lever to move said second end of said locking lever into the path of said slide when said door frame is moved outwardly from its normal position and which yields to allow said locking lever to move out of the path of said slide and to permit said second surface of said slide to engage said arcuate surface when during the closing movement of said frame said locking lever reengages said body and swings to carry said second end of said locking lever out of the path of said slide, and a handle mechanism mounted on said frame and including a cam plate connected to said slide, a handle, a shaft to which said handle is secured, a spring connected to said shaft yieldingly resisting turning of said slide and said handle, and means connecting said shaft to said cam plate to cause turning of said shaft in opposition to the last-mentioned spring to be accompanied by turning movement of said cam plate and to cause said cam plate to move said slide to unlock and to swing the first-mentioned lever.

26. In a door structure, the combination of a body having a door opening, a hinged door frame normally received within said opening and having at least one edge separated from the corresponding edge of said opening by a finger-receiving space, and a door panel supported by and movably connected to said frame for movement toward and from the latter, said panel having a marginal portion extending beyond said frame and overlapping a marginal portion of said opening.

27. In a door structure, the combination of a body having a door opening, and a door normally closing said opening and having at least one edge separated from the corresponding edge of said opening by a finger-receiving space, said door comprising an inner part hinged to said body and an outer part overlapping a margin of said opening and arranged to move toward and from said inner part.

28. In a door structure, the combination of a body having a door opening, and a door normally closing said opening, and having at least one edge separated from the corresponding edge of said opening by a finger-receiving space, said door comprising an inner part hinged to said body, an outer part carried by said inner part and overlapping a margin of said opening, and resiliently yieldable means connecting said parts and arranged to permit said inner parts to move to its fully closed position when an obstruction is placed between said outer part and a margin of said opening.

29. In a door structure, the combination of a body having a door opening, and a hinged door normally closing said opening and having at least one edge separated from the corresponding edge of said opening by a finger-receiving space, said door comprising inner and outer resiliently connected parts, said outer part having a marginal portion which normally contacts with said body and is arranged to be stopped by an obstruction during its closing movement while said inner part continues its closing movement.

30. In a door structure, the combination of a body having a door opening, and a door normally closing said opening and having at least one edge separated from the corresponding edge of said opening by a finger-receiving space, said door comprising a part hinged to said body, a second part carried by the first part, and a plurality of pivoted members connecting said parts and arranged to permit relative inward and outward movement of said parts.

31. In a door structure, the combination of a body having a door opening, and a door normally closing said opening and having at least one edge separated from the corresponding edge of said opening by a finger-receiving space, said door comprising an inner part hinged to said body, the outer part carried by the first part, a plurality of members connecting said parts and arranged to permit their relative inward and outward movement, and resilient means arranged to cause said outer part yieldingly to follow said inner part during the closing movement of the latter.

32. In a door structure, the combination of a body having a door opening, and a door normally closing said opening, and having at least one edge separated from the corresponding edge of said opening by a finger-receiving space, said door comprising an inner part hinged to said body, an outer part carried by said inner part, a plurality of members supported by said inner part and connected to said outer part, and means connected to said members to cause them to move said outer part toward and from said inner part.

33. In a door structure, the combination of a body having a door opening, and a door normally closing said opening and having at least one edge separated from the corresponding edge of said opening by a finger-receiving space, said door comprising an inner part hinged to said body, an outer part carried by said inner part, a plurality of members supported by said inner part and connected to said outer part, and means connected to said members to cause them to move said outer part toward and from said inner part, said means including a door handle.

34. In a door structure, the combination of a body having a door opening, and a door normally closing said opening and having at least one edge separated from the corresponding edge of said opening by a finger-receiving space, said door comprising an inner part hinged to said body, an outer part carried by said inner part, a plurality of members supported by said inner part and connected to said outer part, and means connected to said members to cause them to move said outer part toward and from said inner part, said means including a part operated by the swinging of said inner part.

35. In a door structure, the combination of a body having a door opening, and a door normally closing said opening and having at least one edge separated from the corresponding edge of said opening by a finger receiving space, said door comprising an inner part hinged to said body, an outer part carried by said inner part, a first pair of members supported by said inner part and connected to said outer part adjacent to the free edge, a second pair of members supported by said inner part and connected to said outer part adjacent to the hinge edge, means including a door handle connected to the first pair of members to cause them to move said outer part toward and from said inner part, and means including a part connected to the second pair of members and operated by swinging of said inner part to cause said second pair of members to move said outer part toward and from said inner part.

36. In a door structure, the combination of a body having a door opening, and a door normally closing said opening and having at least one edge separated from the corresponding edge of said opening by a finger-receiving space, said door comprising an inner part hinged to said body, an outer part carried by said inner part and normally contacting a margin of said opening, and parallel motion mechanism connecting said outer part to said inner part and arranged to move said outer part toward and from said inner part.

37. In a door structure, the combination of a body having a door opening, and a door normally closing said opening and having at least one edge separated from the corresponding edge of said opening by a finger-receiving space, said door comprising an inner part hinged to said body, an outer part carried by said inner part and normally contacting a margin of said opening, parallel motion mechanism connecting said outer part to said inner part and arranged to move said outer part toward and from said inner part, and resilient means tending to move said outer part toward said inner part.

38. In a door structure, the combination of a body having a door opening, and a door normally closing said opening and having at least one edge separated from the corresponding edge of said opening by a finger-receiving space, said door comprising an inner part hinged to said body, an outer part carried by said inner part and normally contacting a margin of said opening, parallel motion mechanism connecting said outer part to said inner part and arranged to move said outer part toward and from said inner part, resilient means tending to move said outer part toward said inner part, and mechanism to move said outer part from said inner part against the yielding opposition of said resilient means.

39. In a door structure, the combination of a body having a door opening, and a door normally closing said opening, and having at least one edge separated from the corresponding edge of said opening by a finger-receiving space, said door comprising an inner part hinged to said body, an outer part carried by said inner part and normally contacting a margin of said opening, parallel motion mechanism connecting said outer part to said inner part and arranged to move said outer part toward and from said inner part, resilient means tending to move said outer part toward said inner part, and mechanism to move said outer part from said inner part against the yielding opposition of said resilient means, the last mentioned mechanism including a door handle and a part operated by swinging of said inner part.

40. In a door structure, the combination of a body having a door opening, and a hinged door normally closing said opening and having at least one edge separated from the corresponding edge of said opening by a finger-receiving space, said door comprising inner and outer parts, one carried by the other and one movable inwardly and outwardly toward and from the other, resilient means tending to move said outer part toward said inner part, and locking means normally locking said inner part to said body and said outer part to said inner part.

41. In a door structure, the combination of a body having a door opening, and a hinged door normally closing said opening and having at least one edge separated from the corresponding edge of said opening by a finger-receiving space, said door comprising inner and outer parts, one carried by the other and one movable inwardly and outwardly toward and from the other, resilient means tending to move said outer part toward said inner part, a first locking means normally locking said inner part to said body, a second locking means normally locking said outer part to said inner part, a door handle, and means operated by said handle to cause the unlocking of said outer part and the unlocking of said inner part.

42. In a door structure, the combination of a body having a door opening, and a hinged door normally closing said opening and having at least one edge separated from the corresponding edge of said opening by a finger-receiving space, said door comprising inner and outer parts, one carried by the other and one movable inwardly and outwardly toward and from the other, resilient means tending to move said outer part toward said inner part, a first locking means normally locking said inner part to said body, a second locking means normally locking said outer part to said inner part, a door handle, and means operated by said handle to cause the unlocking of said outer part, the unlocking of said inner part, and the moving of said outer part outwardly with relation to said inner part in opposition to said resilient means.

43. In a door structure, the combination of a body having a door opening, and a hinged door normally closing said opening and having at least one edge separated from the corresponding edge of said opening by a finger-receiving space, said door comprising inner and outer parts, one movable inwardly and outwardly toward and from the other, resilient means tending to move said outer part toward said inner part, locking means normally locking said outer part to said inner part, and means consequent upon outward swinging of said inner part to cause the unlocking of said outer part.

44. In a door structure, the combination of a body having a door opening, and a hinged door normally closing said opening and having at least one edge separated from the corresponding edge of said opening by a finger-receiving space, said door comprising inner and outer parts, one moving inwardly and outwardly toward and from the other, resilient means tending to move said outer part toward said inner part, locking means normally locking said outer part to said inner part, and means consequent upon outward swinging of said inner part to cause the unlocking of said outer part, and the moving of said outer part outwardly with relation to said inner part in opposition to the resistance of said resilient means.

45. In a door structure, the combination of a body having a door opening, a hinged door frame normally received in said opening and having at least one edge separated from the corresponding edge of said opening by a finger-receiving space, a door panel having a marginal portion overlapping said space, and means supporting said panel on said frame for movement toward and from said frame.

46. In a door structure, the combination of a body having a door opening, a hinged door frame normally received in said opening and having at least one edge separated from the corresponding edge of said opening by a finger-receiving space, a door panel having a marginal portion overlapping said space, means supporting said panel on said frame for movement toward and from said frame, and means to utilize movement of said frame to move said panel relatively to said frame.

47. In a door structure, the combination of a body having a door opening, a hinged door frame normally received in said opening and having at least one edge separated from the corresponding edge of said opening by a finger-receiving space, a door panel having a marginal portion overlapping said space, means supporting said panel on said frame for movement toward and from said frame, yielding means tending to move said panel toward said frame, and means to utilize movement of said frame to move said panel from said frame in opposition to said yielding means.

48. In a door structure, the combination of a body having a door opening, a hinged door frame normally received in said opening and having at least one edge separated from the corresponding edge of said opening by a finger-receiving space, a door panel having a marginal portion overlapping said space, means supporting said panel on said frame for movement toward and from said frame, yielding means tending to move said panel toward said frame, means to utilize movement of said frame to move said panel from said frame in opposition to said yielding means, and means normally to lock said panel to prevent the same from moving from said frame.

49. In a door structure, the combination of a body having a door opening, a hinged door frame normally received in said opening and having at least one edge separated from the corresponding edge of said opening by a finger-receiving space, a door panel having a marginal portion overlapping said space, means supporting said panel on said frame for movement toward and from said frame, yielding means tending to move said panel toward said frame, means to utilize movement of said frame to move said panel from said frame in opposition to said yielding means, locking means normally to lock said panel to prevent the same from moving from said frame, and means connected to said locking means to cause first the unlocking of said panel and then the movement of said panel from said frame.

CHARLES W. SHERMAN.